United States Patent [19]
Rieger

[11] 3,943,990
[45] Mar. 16, 1976

[54] ANTI-SKID AND PROTECTIVE CHAIN

[76] Inventor: Hansjorg W. Rieger, Saarstrasse 48, 708 Aalen, Germany

[22] Filed: Oct. 4, 1974

[21] Appl. No.: 512,352

[30] Foreign Application Priority Data
Oct. 12, 1973  Germany............................ 2352080

[52] U.S. Cl. ............................... 152/243; 152/245
[51] Int. Cl.² ........................................ B60C 27/00
[58] Field of Search 59/84; 152/170, 171, 231–245, 152/223, 224, 172

[56] References Cited
UNITED STATES PATENTS

| | | | |
|---|---|---|---|
| 1,460,504 | 7/1923 | Schaefer | 152/245 X |
| 2,340,171 | 1/1944 | Boyer | 152/245 |
| 3,490,511 | 1/1970 | Muller | 152/243 |

*Primary Examiner*—Drayton E. Hoffman
*Assistant Examiner*—Larry H. Martin
*Attorney, Agent, or Firm*—Smythe & Moore

[57] ABSTRACT

A tire chain having horizontal links of high breaking strength and vertical links having high resistance to wear and tear.

4 Claims, 3 Drawing Figures

ANTI-SKID AND PROTECTIVE CHAIN

This invention relates to an anti-skid and protective chain for tires having a tread net which comprises closed horizontal links and vertical links, the welded horizontal links being made of case hardened steel and having a larger inner width than the vertical links.

Anti-skid and protective chains for tires of the aforementioned type wherein the vertical links also consist of case hardened steel are known to the applicant. When producing these chains the horizontal and vertical links are hardened after joining. In this manner a chain net of which the constructional parts all have the same hardness and the same depth of hardening zone is produced. The depth of the hardening zone is limited in the case of this type of chain on account of the susceptibility to breaking of the horizontal links which have a larger inner width. This means that the depth of the hardening zone for the vertical links to which a higher stress is applied, cannot be chosen as large as the lower susceptibility to breaking of the vertical links would allow owing to the smaller inner width. As a consequence, one has to put up with a rather unsatisfactory wear and tear of the vertical links.

In the case of another type of chain known to the applicant the aforementioned difficulties are avoided by submitting the vertical links to a recarburization process before joining in order to improve the properties as to wear and tear in respect of the vertical links of the chain net which is subsequently hardened as a whole. However, the increased resistance to wear and tear in respect of such chains is at the expense of higher manufacturing costs, because long periods of recarburization are required in order to obtain an adequate depth of carburization, particularly in the case of large link dimensions.

Finally, chains of which the horizontal and vertical links consist of tool-steel, i.e. of a material which allows a uniform through-hardening, are known to the applicant. These chains have good properties as regards wear and tear, but they are not completely satisfactory because, as a result of the tool-steel not being weldable, only open and closed links can be combined and the higher resistance to wear and tear of the links is at the expense of the lower strength of the open chain links in particular at the expense of the endurance limit. Moreover, the open chain links which are normally the horizontal links, must have a comparatively large inside length, due to constructional conditions, which fact does not only increase their susceptibility to breaking, but also limits the attainable density of the net.

An object of this invention is to provide an anti-skid and protective chain for tires of the type described in the introduction, wherein a happy synthesis is achieved between horizontal links having a high breaking strength and vertical links having a high resistance to wear and tear, in a particularly simple manner by a suitable choice of material for the horizontal and vertical links. This object is achieved according to the invention in that the horizontal links have a recarburized surface zone which has a maximum thickness of 2 millimeters and a surface zone carbon content of 0.6 to 0.9 % and that the vertical links which consist of an alloyed super-refined steel having 0.5 to 0.9 % of carbon and which are hardened together with the horizontal links, have a grain hardness of at least 600 HV (test force 300 N) when hardened. The anti-skid and/or protective chain for tires in accordance with the invention combines the advantage of high strength, in particular the endurance limit of chain nets having closed horizontal and vertical links of case hardened steel, with the advantage of high resistance to wear and tear of chains having vertical links made of tool-steel. Since the depth of the carburization of the recarburized surface zone of the horizontal links may be much smaller than the depth of the carburization of the recarburized vertical links, the manufacturing costs required for the carburization remain within bearable limits and the chain according to the invention exhibits a well-balanced relationship between price and economic value.

The invention will now be described in detail by way of example, with reference to the attached drawings, in which.

Figure 1:
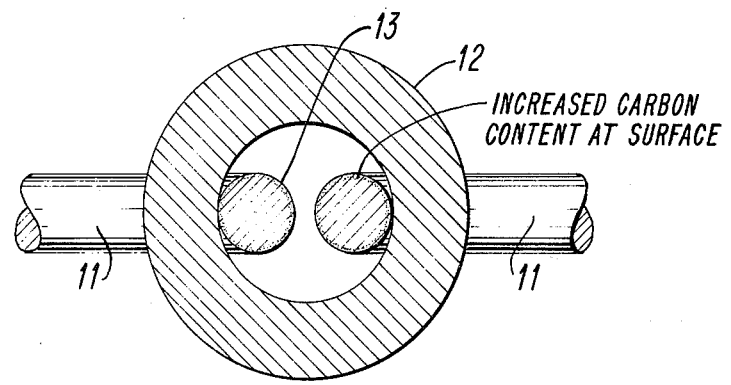
FIG. 1 is a fragmentary sectional view of three links of a chain made in accordance with the present invention.

FIG. 1 shows two horizontal links 11 and a vertical link 12 of the tread net of a protective chain for tires. The through-hardened vertical link is represented in section in order to illustrate that it has approximately the same structure and the same hardness over its whole cross-section, whereas the cross-section of the horizontal links 11 illustrates that the horizontal links are hardened by an increased carbon content only in the region of a surface zone 13. The hard layer is on the one hand thick enough to give the horizontal links the required resistance to wear and tear and is thin enough, on the other hand, not to affect their toughness to an undesirable extent.

Figure 2:
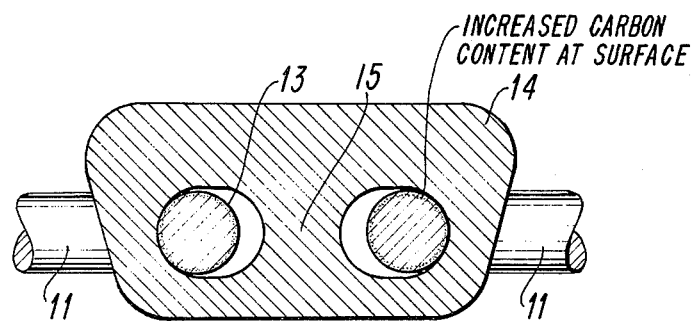
FIG. 2 is similar to FIG. 1 except that it shows a modification thereof.

Whereas in FIG. 1 the horizontal as well as the vertical links consist of rings, FIG. 2 shows an embodiment wherein vertical links 14 having cross pieces 15 are combined with annular horizontal links 11.

Figure 3:
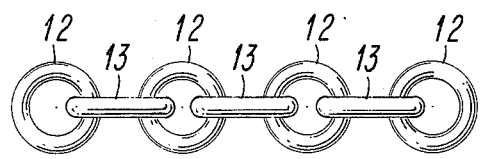
FIG. 3 shows a plurality of links of the chain of FIG. 1, such being incorporated in an anti-skid chain.

FIG. 3 shows a plurality of links of the form of chain shown in FIG. 1 which can be used in a tire chain, as is well known in the art.

Having now particularly described and ascertained our said invention and in what manner the same is to be performed we declare that what we claim is:

1. An anti-skid chain for tires having a tread net which comprises closed interconnected horizontal links and vertical links, the horizontal links being of case hardened steel and having an inner width larger than that of the vertical links, said horizontal links having a recarburized surface zone of a maximum thickness of two millimeters and a carbon content of 0.5 to 0.9%, and said vertical links consisting of an alloyed super refined steel having a carbon content of 0.5 to 0.9%, said vertical and horizontal links being hardened with a grain hardness of at least 600 HV (test force 300 N) in the hardened condition.

2. An anti-skid chain for tires according to claim 1, wherein the recarburized surface zone of the horizontal links is 0.8 to 1.3 mm thick.

3. An anti-skid chain for tires according to claim 1 wherein the horizontal links and the vertical links are in the form of rings.

4. An anti-skid chain for tires according to claim 1 wherein the horizontal links are in the form of rings and the vertical links include cross-pieces.

* * * * *